(12) United States Patent
Mortensen et al.

(10) Patent No.: US 12,319,576 B2
(45) Date of Patent: Jun. 3, 2025

(54) HIGH TEMPERATURE REACTOR VESSEL, PLANT AND METHOD

(71) Applicant: HALDOR TOPSØE A/S, Kgs. Lyngby (DK)

(72) Inventors: Peter Mølgaard Mortensen, Roskilde (DK); Michael Boe, Klampenborg (DK); Louise Jivan Shah, Vedbæk (DK); Thomas Sandahl Christensen, Kgs. Lyngby (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 660 days.

(21) Appl. No.: 17/599,759

(22) PCT Filed: Apr. 15, 2020

(86) PCT No.: PCT/EP2020/060587
§ 371 (c)(1),
(2) Date: Sep. 29, 2021

(87) PCT Pub. No.: WO2020/216659
PCT Pub. Date: Oct. 29, 2020

(65) Prior Publication Data
US 2022/0169503 A1 Jun. 2, 2022

(30) Foreign Application Priority Data

Apr. 23, 2019 (DK) .................. PA 2019 00475

(51) Int. Cl.
*C01B 3/40* (2006.01)
*C01B 3/38* (2006.01)

(52) U.S. Cl.
CPC ................ *C01B 3/40* (2013.01); *C01B 3/388* (2013.01); *C01B 2203/0216* (2013.01); *C01B 2203/0283* (2013.01)

(58) Field of Classification Search
None
See application file for complete search history.

(56) References Cited

U.S. PATENT DOCUMENTS

| 5,658,538 A | 8/1997 | Deimling et al. |
| 2004/0063797 A1 | 4/2004 | Aasberg-petersen et al. |
| 2005/0095186 A1 | 5/2005 | Mcgee |
| 2005/0229490 A1 | 10/2005 | Stevens |

(Continued)

FOREIGN PATENT DOCUMENTS

| CN | 102580624 A | 7/2012 |
| CN | 102847491 A | 1/2013 |

(Continued)

OTHER PUBLICATIONS

Danish Search Report dated Oct. 17, 2019 and Danish Search Opinion dated Oct. 21, 2019 issued in corresponding Danish Patent Application No. PA 2019 00475 by the Danish Patent and Trademark Office. (9 pages).

(Continued)

*Primary Examiner* — Stefanie J Cohen
(74) *Attorney, Agent, or Firm* — Boone IP Law

(57) ABSTRACT

A reactor vessel for high temperature catalytic reactions is provided, in which the inlet portion has a particular design. A plant comprising this reactor vessel is also provided.

24 Claims, 8 Drawing Sheets

(56) References Cited

U.S. PATENT DOCUMENTS

| | | | |
|---|---|---|---|
| 2007/0261304 A1 | 11/2007 | Zanichelli | |
| 2008/0277315 A1* | 11/2008 | Ringer | B01J 35/55 |
| | | | 502/328 |
| 2011/0137089 A1 | 6/2011 | Abbott | |
| 2014/0252277 A1 | 9/2014 | Abbott et al. | |

FOREIGN PATENT DOCUMENTS

| | | |
|---|---|---|
| EP | 1403216 A1 | 3/2004 |
| EP | 2140932 A1 | 1/2010 |
| EP | 2142467 A1 | 1/2010 |
| WO | 0066487 A1 | 11/2000 |
| WO | 2008122399 A1 | 10/2008 |
| WO | 2012131318 A1 | 10/2012 |
| WO | 2014111315 A1 | 7/2014 |
| WO | 2017211885 A1 | 12/2017 |

OTHER PUBLICATIONS

International Search Report (PCT/ISA/210) and Written Opinion (PCT/ISA/237) mailed on Jul. 23, 2020 by the European Patent Office as the International Searching Authority for International Application No. PCT/EP2020/060587. (13 pages).

First Office Action with English translation mailed on Mar. 6, 2024, by the China National Intellectual Property Administration for Chinese Application No. 202080030651.9, 18 pages.

Second Office Action with English translation mailed on Oct. 11, 2024, by the China National Intellectual Property Administration for Chinese Application No. (2020800306519), 17 pages.

* cited by examiner

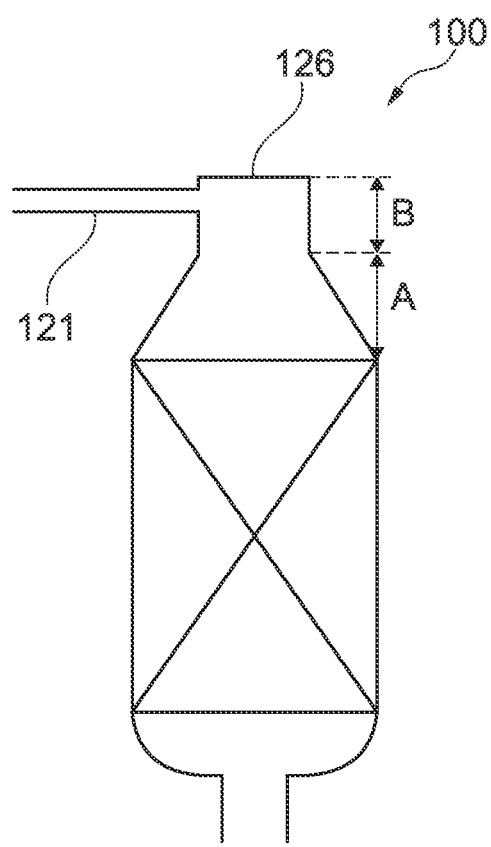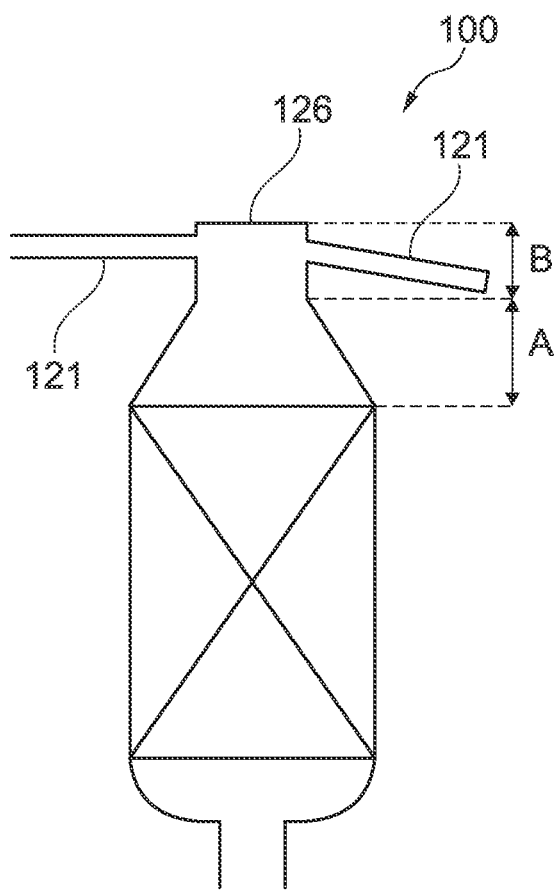
Fig. 2c
Fig. 2d

HIGH TEMPERATURE REACTOR VESSEL, PLANT AND METHOD

TECHNICAL FIELD

A reactor vessel for high temperature catalytic reactions is provided, in which the inlet portion has a particular design. A plant comprising this reactor vessel is also provided.

BACKGROUND

The use of high temperatures and pressures in a chemical plant places specific requirements on the materials and construction of plant components such as reactor vessels, tubing, valves etc.

Gas temperatures of over 750° C. may be reached, at which temperature, metals—such as stainless steel—lose mechanical strength and begin to soften. For this reason, steel vessels and tubing are often protected by protective coating, e.g. ceramic linings, known as brick linings.

Additionally, gas pressures of 15-45 bar may be reached. This requires special attention inter alia—to the geometry and construction of plant components, so that they can withstand such pressures. Such reactors typically also involve rapid gas flow due to the large amounts of reactants being processed, which—in turn—places particular requirements on materials and construction e.g. if gases are to be mixed.

Catalytic reactor vessels require good mixing of reagent gases before the gas flow enters the catalyst bed, as mixing of gas flows inside the bed is limited. Furthermore, at high gas flow rates, there is a risk that the gas disturbs the catalyst bed, which may cause non-optimal catalytic conversion and even milling, grinding, or fluidization of individual catalyst particles as they make physical contact.

Typical industrial gas phase catalytic reactors use an inlet distributor, which is typically a perforated plate, placed at the gas inlet, below the spherical head of the reactor top. The use of high temperatures in chemical plants restricts the use of such distributors to promote gas mixing. Distributors can have complex structures which are difficult to adequately protect by coating. Additionally, distributors made of metal e.g. stainless steel, tend to lose their mechanical strength at the high temperatures involved.

There is therefore a need to address some or all of the above problems when designing and constructing chemical plants and their components, in particular reactor vessels for high temperature catalytic reactions. Reactor vessels for high temperature use should promote efficient gas mixing, while avoiding additional elements such as distributors. At the same time, disturbance—and especially milling—of catalyst particles should be reduced, or even avoided.

SUMMARY

A reactor vessel for high temperature catalytic reactions is thus provided. The reactor comprises a body portion, an inlet end portion and an outlet end portion, wherein said body portion extends between said inlet end portion and said outlet end portion and wherein said body portion, said inlet end portion and said outlet end portion together define a reactor cavity, wherein said body portion, having a substantially cylindrical form about a central axis X-X of said reactor vessel;
a catalyst bed of catalyst particles being located within said reactor cavity in said body portion, said catalyst bed being defined by opposing first and second bed surfaces;
said inlet end portion comprising one or more gas inlets;
said outlet end portion comprising one or more gas outlets;
characterised in that:
said inlet end portion (120) comprises at least one sidewall (125); said sidewall(s) (125) comprising a diverging section (A) where the sidewall(s) (125) join the body portion (110),
and wherein said gas inlets (121) are arranged exclusively in a sidewall (125) of the inlet end portion (120); each gas inlet (121) defining a primary gas inlet flow direction vector (V) along which gas enters said reactor cavity (101), wherein said gas inlets are arranged such that the primary gas inlet flow direction vector (V) does not intersect said central axis (X-X),
and wherein the interior space of the inlet end portion (120) is constructed so that the cross-sectional area available for gas flow is constant or increasing along the central axis X-X in the direction from the gas inlets (121) to the body portion (110).

The invention is based on the recognition that it is possible to dispense with a gas distributor, e.g. in the form of a perforated plate disposed at the lower end of the gas inlet portion of the reactor above the body portion, when all of the feed gas to the reactor is introduced into gas inlet portion in a direction tangential to the sidewall of the gas inlet portion, and when the gas inlet portion has a form, which expands and diverge towards the body portion. In such a construction of the reactor, the gas is imparted a spiral movement through the inlet end portion, and the inlet end portion is arranged so to as allow said spiral movement to continue unhindered until the gas reaches the catalyst bed of the body portion. At the same time it has been found that said construction of the reactor makes it possible to obtain sufficient mixing of the feed gas stream and hence dispense with a separate gas mixer element. The expansion of the spiral flow will result in a certain level of mixing. Finally, it has been found that said construction of the reactor makes it possible to avoid disruption of the catalyst bed by the gas flow, as said construction of the reactor avoid generation of gas jets into the reactor and hence into the catalyst bed.

A process for high temperature catalytic reactions comprising the steps of
leading a gas having a temperature of at least 750° C. to at least one gas inlet of the reactor vessel of the invention, and
subjecting the gas to a catalytic reaction in said reactor vessel.

A plant for producing synthesis gas with a predetermined $H_2/CO$ ratio from a hydrocarbon feed is also provided. The plant comprises:
a steam reforming reactor comprising a first catalyst and being arranged to react said hydrocarbon feed with steam and thereby produce a first synthesis gas stream;
a reactor vessel as defined herein, in which the catalyst particles are active for the steam reforming/methanation and reverse water gas shift reactions;
a first feed line arranged to lead at least a part of said first synthesis gas stream from the steam reforming reactor to at least one gas inlet of said reactor vessel;
a second feed line arranged to supply a second, $CO_2$-rich, gas feed to said reactor vessel; either directly via a separate gas inlet, or via a mixing section; wherein said mixing section is arranged to receive at least said first synthesis gas stream and said second gas feed from said first and second feed lines, mix said first and second gas feeds to form a gas mixture, and feed the gas mixture to at least one gas inlet of said reactor vessel;

said reactor vessel being arranged to react the first synthesis gas stream with said second gas feed of $CO_2$ and thereby provide synthesis gas with a predetermined $H_2/CO$ ratio via an outlet of said reactor vessel.

A method for producing synthesis gas with a predetermined $H_2/CO$ ratio from a hydrocarbon feed, using the plant of the invention, is also provided.

Further details of the invention are set forth in the following description, figures and claims.

LEGENDS

FIGS. 2a-2d illustrate various embodiments of the reaction vessel, with various designs of inlet end portions.

DETAILED DISCLOSURE

Definitions

Figure 1:
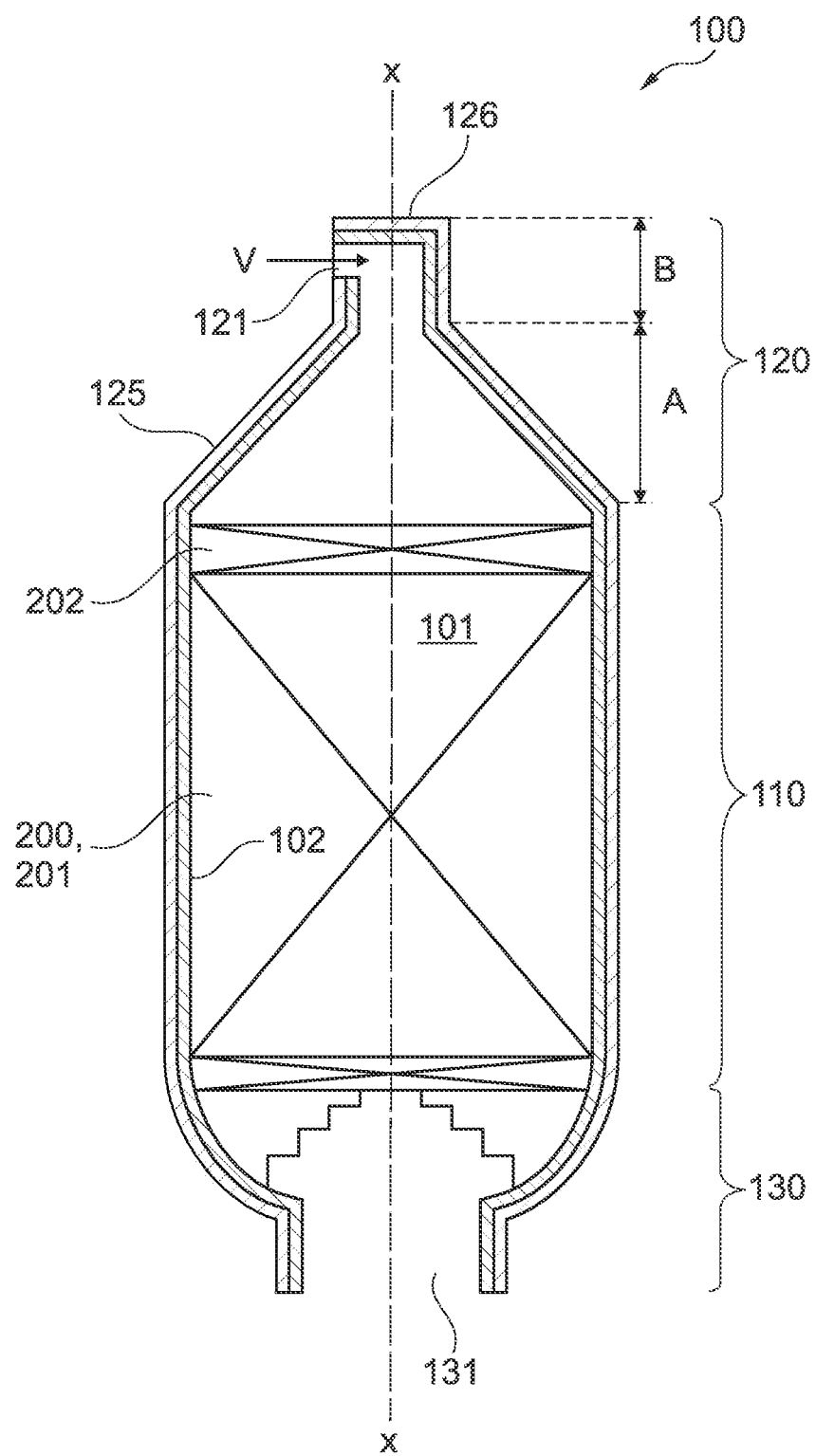
FIG. 1 shows a schematic view of a reaction vessel according to the invention, seen in cross-section along central axis X-X.

In the present technology, the term "high temperature" should be understood as meaning at least 750° C., preferably at least 800° C.

In the present technology, the term "high pressure" should be understood as meaning at least 15 bar, preferably at least 20 bar, and up to 45 bar.

For the present invention, the expression "resistant to heat-induced deformation and degradation" means a lifetime of the surface in question of at least one month of operation when using a gas with a reactor vessel entry temperature of 1000° C.

Specific Embodiments

The present invention relates to a specific configuration of a high-temperature reactor vessel (e.g. an Adiabatic Post Convertor, which is used for conversion of a mixture of $CO_2$ and syngas into CO rich syngas). The reactor is suitable for high temperature operation (>750° C.), at which temperatures mechanical solutions can be limited by temperature durability issues. The reactor vessel may be selected from an adiabatic post convertor or water gas shift reactor.

A reactor vessel is therefore provided, suitable for high temperature catalytic reactions. The reactor vessel comprises a body portion, an inlet end portion and an outlet end portion. along The reactor vessel has a central axis X-X. The body portion has a substantially cylindrical form about a central axis X-X of the reactor vessel. The body portion extends between the inlet end portion and the outlet end portion along the central axis X-X of said reactor vessel. The reactor vessel is essentially hollow, so the body portion, said inlet end portion and said outlet end portion together define a reactor cavity.

In a particular embodiment of the reactor vessel of the invention, all gas-contacted inner surfaces of said reactor vessel are coated or lined with a layer of ceramic material The walls of the reactor vessel are typically constructed of metal, e.g. stainless steel, with a wall thickness of e.g. 5-10 mm so that they can withstand the high pressures within the reactor. Inner surfaces of the reactor vessel (i.e. the reactor cavity, gas inlets and gas outlets) are lined with a layer of ceramic material, to insulate the metal walls from the hot gas and thereby keep the metal part cooler. The layer of ceramic material may be in the form of $Al_2O_3$ bricks, $ZrO_2$ bricks, or another appropriate ceramic material. The layer of ceramic layer may have a thickness of 10-100 cm, say 50 cm. The reactor vessel is typically large, with a total length along the central axis X-X of ca. 50-500 cm, and a diameter of the body portion about the central axis of ca. 50-300 cm.

The reactor vessel has an inlet end, being the point of maximum extension in the direction of the central axis X-X at the end where gas enters the vessel. An inlet end portion is defined, being the portion of the vessel between the body portion and the inlet end of the vessel. Similarly, the reactor vessel has an outlet end, being the point of maximum extension in the direction of the central axis X-X at the end where gas exits the vessel (i.e. opposite the inlet end). An outlet end portion is defined, being the portion of the vessel between the body portion and the outlet end of the vessel.

The reactor vessel has one or more sidewalls, being the walls of the vessel which extend primarily in the direction of the central axis X-X. When the reactor vessel has a circular cross-section along its entire length (from inlet end to outlet end) the vessel has essentially one sidewall which encircles the central axis X-X. The reactor vessel may also comprise endwalls at the inlet end of the reactor vessel, which extend primarily in a direction perpendicular to the central axis X-X and close off the inlet end portion and outlet end portions. Depending on the construction, separate endwalls may be omitted, and curved or sloping sidewalls may meet, thereby forming the inlet and outlet ends of the reactor vessel.

The inlet end portion and the outlet end portion typically have circular cross-sections about the central axis X-X of the reactor vessel. As shown in the figures, this circular cross-section is typically smaller than the cross-section of the body portion. Furthermore, the circular cross-section of the inlet end portion and the outlet end portion typically decreases from the body portion towards the inlet or outlet end.

The inlet end portion comprises one or more gas inlets, while the outlet end portion comprising one or more gas outlets. Apart from these gas inlets and gas outlets, the walls of the reactor vessel completely enclose the reactor cavity, as shown in the Figures.

The reactor vessel is designed to stand on a substantially horizontal surface with the central axis X-X aligned substantially vertically, such that the inlet end portion is located at the upper end (i.e. furthest from the horizontal surface) while the outlet end portion is located at the lower end. Gas flow in the reactor vessel typically takes place in a generally downwards direction, from the inlet end portion, through the body portion, to the outlet end portion.

A catalyst bed of catalyst particles is located within the reactor cavity in the body portion. To avoid by-pass of gas, the catalyst bed fills the entire cross-section of the body portion of the reactor vessel. The catalyst bed is only located within the body portion, so that gases pass through the entire cross-sectional area of the catalyst bed. The catalyst bed typically fills at least 60% of the body portion in the direction of the central axis X-X, typically at least 75%, more preferably at least 80%, and optionally the entirety of the body portion in the direction of the central axis X-X.

The catalyst bed comprises or constitutes catalyst particles, amassed within the body portion. The catalyst particles typically comprise a ceramic material which can itself be catalytic, but which is preferably coated and/or impregnated with a catalytic active metal or metal salt. Catalyst particles are typically micro- or macroporous, and have dimensions on the millimetre or centimetre scale. The nature, construction and methods for manufacture of catalyst particles depend on the nature of the reaction to take place in the reactor vessel, and can be selected by the skilled person accordingly.

The catalyst bed may comprise two or more types of different catalyst particles, which are suitably arranged in two or more separate layers. Catalyst particles may be "different" in terms of their catalytic effect (e.g. different catalyst loading for the same catalytic reaction), their physical form (e.g. pore size, particle size), or in terms of the catalytic reaction which they carry out. This allows the skilled plant engineer to tailor the reactions within the reactor vessel as required. As an example, it can be advantageous to have large catalyst particles as a top layer to avoid fluidization of the catalyst, while having a second layer of smaller catalyst particles which will have higher catalytic activity.

The catalyst bed is defined by first and second bed surfaces. The first bed surface is that surface located closest to the inlet end portion of the reactor vessel (i.e. the upper surface of the catalyst bed, when the reactor vessel stands vertically as described above). First bed surface may be arranged substantially perpendicular to said central axis X-X. Gas flow enters the catalyst bed at the first bed surface, flows through the catalyst bed, and exits the catalyst bed at the second bed surface (i.e. the lower surface of the catalyst bed, when the reactor vessel stands vertically as described above). Once a gas flow enters the catalyst bed, the physical presence of the catalyst particles reduces gas mixing and reduces gas flow in a direction perpendicular to the central axis X-X. It is therefore important to maximise gas mixing, prior to gas entering the catalyst bed.

The catalyst bed is supported by—and in contact with—the sidewalls of the body portion of the reactor vessel. The body portion may further comprise catalytically-inert particles. These may be mixed with the catalyst particles or present in one or more separate layers. In one aspect, a layer of catalytically-inert particles is arranged at the first bed surface. Such an arrangement provides a "buffer" layer which further protects the catalyst particles of the catalyst bed from physical disturbance and/or milling.

At the outlet end portion, the catalyst bed is supported on catalytically-inert particles and/or a ceramic support structure.

The inlet end portion of the reactor vessel and the gas inlets have a particular design. The inlet end portion comprises at least one sidewall; said sidewall(s) comprising a diverging section (A) where the sidewall(s) join the body portion.

The "diverging section (A)" is a section of the inlet end portion, located at the part of the inlet end portion where it meets the body portion. In this diverging section, the sidewall(s) of the inlet end portion diverge from the body portion, along the direction of the central axis X-X. In other words, the cross-sectional area of the inlet end portion decreases in the diverging section A from the body portion, along the direction of the central axis X-X. This means that the sidewalls in the diverging section A are closer to each other (and closer to the central axis X-X) than in the body portion. For ease of construction of the inlet end portion, the divergence in the diverging section A is gradual; i.e. the sidewalls slope or curve towards each other in this diverging section A.

The gas inlets are arranged in a sidewall of the inlet end portion. Each gas inlet defines a primary gas inlet flow direction vector (V) along which gas enters said reactor cavity. The gas inlets are arranged such that the primary gas inlet flow direction vector (V) does not intersect said central axis (X-X).

The particular design of the gas inlet(s) and the inlet end portion, mean that gas entering the inlet end portion via said inlet(s) initially follows a spiral or circular path, about the central axis X-X. As the primary gas inlet flow direction vector (V) does not intersect the central axis (X-X), linear motion of the gas is transformed into rotary motion about the central axis X-X. As gas passes along the reactor vessel, in the direction of the central axis X-X, the diverging section (A) increases the radius of the spiral or circular path, slowing the gas flow. At all stages, the change in flow direction and/or flow rate of the gas promotes mixing.

The particular design of the gas inlet(s) and the inlet end portion are designed such that the cross-section (as evaluated perpendicular to the central axis of relevant section) of the inlets and inlet-portion is monotonically increasing along the principal flow direction vector in said gas inlets and said inlet end portion. This embodiment allows for a gradual deacceleration of the gas velocity, consequently eliminating, or significantly reduces, the tendency for jet formation of the gas flow; without the need for a dedicated mechanical installation, such as an inlet distributor configured such as a perforated plate.

By monotonically increasing, is understood function such as $f(z)$, where all combinations of x and y, where when $x \leq y$ follows that $f(x) \leq f(y)$.

This technology demonstrates how the combination of a conical head and a swirl inlet allows for a reactor configuration without a dedicated flow distributor or mixer. As above, having an inlet distributor to a reactor is difficult when the reaction temperature is above 800° C. because the mechanical strength of the typical steels used for these applications is week. By using a conical head and providing a swirl mechanism, the reactor inlet of the given configuration allows for distributing and mixing the feed uniformly across the downstream catalyst bed without any mechanical distributor.

Figure 2A:
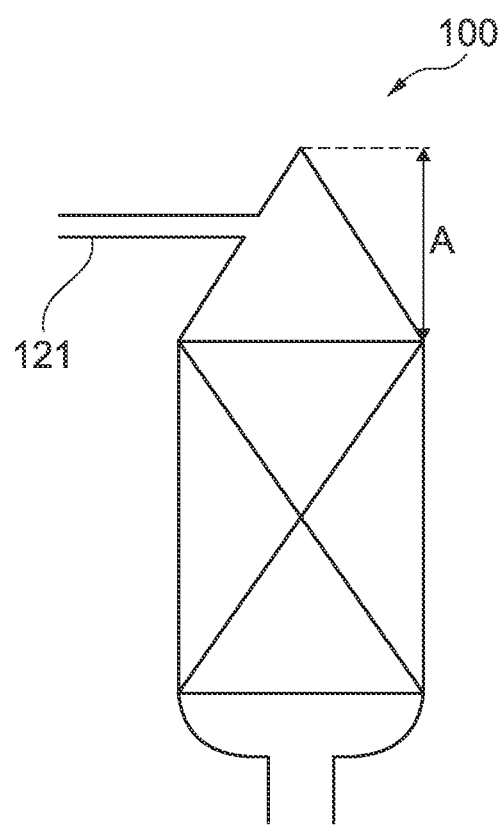
Figure 2B:
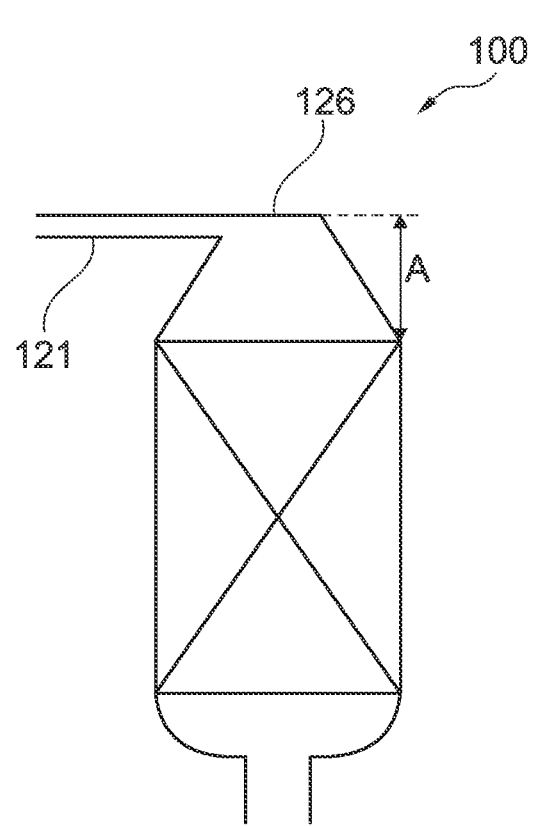

In one aspect, shown in FIG. 2b, diverging section (A) has a substantially frustoconical form in which the sidewall(s) of the inlet end portion diverge from the body portion in the direction of the central axis X-X, and the inlet end portion further comprises an endwall, wherein the sidewall(s) of the inlet end portion extend between the body portion and said endwall. This simple design reduces the amount of wall area, and thus the amount of material used in the vessel construction. This design may also be useful in locations where the maximum height available for the reaction vessel is limited.

In another aspect, shown in FIGS. 2c and 2d the sidewall(s) of the inlet end portion comprise the diverging section (A), and a non-diverging section (B) adjoining said diverging section (A). In the non-diverging section (B), the sidewall(s) of the inlet end portion extend in a direction substantially parallel to said central axis X-X. Essentially, the non-diverging section B has substantially cylindrical form, preferably about the same central axis X-X. In other words, this design takes the form of a larger diameter cylinder (the body portion) joined to a smaller diameter cylinder (the non-diverging section B) via the sidewall(s) of the diverging section A. Also in this aspect, the inlet end portion may further comprise an endwall, wherein the sidewall(s) of the inlet end portion extend between the body portion and said endwall, as shown. An endwall is present at the inlet end of the reactor vessel, which close off the non-diverging section B.

In this aspect, the gas inlet(s) may be arranged in a sidewall of non-diverging section (B) of the inlet end portion. This arrangement is advantageous as it allows horizontal gas inlets to be joined to a vertical sidewall (of the non-diverging section B), which is easier than joining them to a sloping sidewall of the diverging section A.

As a further aspect (FIG. 2a) the sidewall(s) consist of said diverging section (A). The inlet end portion therefore has a substantially conical form which narrows from the body portion along the central axis X-X. The inlet end of the reactor vessel is thus pointed, and no endwall is present per se.

In one preferred aspect, the gas inlet(s) are arranged such that each gas flow direction vector (V) lies in a plane substantially perpendicular to the central axis X-X. This is shown in FIGS. 2a-2c, in contrast to the right-hand gas inlet in FIG. 2d, which is not arranged perpendicular to the central axis X-X. Again, construction is made easier when components of the reactor vessel are aligned at right-angles, and gas flow can be more easily predicted and regulated.

The gas inlet(s) suitably have the form of a circular hollow cylinder in which the primary gas inlet flow direction vector (V) constitutes the central axis of said hollow cylinder. The gas inlet(s) typically comprise inlet tube(s)—having the form of a circular hollow cylinder—in which the primary gas inlet flow direction vector (V) constitutes the central axis of said hollow cylinder. The inlet tube(s) have an inlet sidewall, defining the circular hollow cylinder, and the inlet sidewall is arranged in extension of a tangent (T) to the sidewall of the inlet end portion. This is illustrated most clearly in FIG. 3, in contrast to FIG. 4. This arrangement means that gas flow enters the inlet end portion at a point close to one sidewall of the inlet end portion, and obtains maximal rotational energy (swirling).

Optionally, the inlet end portion comprises two or more gas inlets, and arranged such that each inlet provides a different gas flows to the reactor vessel. The gas flows are "different" in terms of their chemical composition. For instance, in the case where the reactor vessel is adiabatic post convertor, one gas inlet may be arranged to provide synthesis gas, while another may be arranged to provide a CO2-rich gas feed. In the case where the reactor vessel is a adiabatic post convertor, one gas inlet may be arranged to provide synthesis gas, while another may be arranged to provide a $CO_2$-rich gas feed.

Alternatively, the inlet end portion may comprise one gas inlet, arranged to provide a mixture of different gases to the reactor vessel via said one gas inlet (cf. FIGS. 2a-2c). This would require mixing the gases upstream the gas inlet. Such a design—with only one inlet—is easy to construct, and reduces the number of joints in the vessel, reducing the opportunity for failure at the joint. Gas flow and mixing in the vessel is also more readily designed and adjusted when only one gas inlet is present.

If gas feeds are to be mixed prior to being fed to the reactor vessel, the reactor vessel may be included in a "reactor section". A high temperature reactor section is thus provided, comprising
  the reactor vessel as defined herein;
  a first feed line arranged to supply a first gas feed;
  a second feed line arranged to supply a second gas feed;
  a mixing section;
  wherein said mixing section is arranged to receive at least first and second gas feeds from said first and second feed lines, mix said first and second gas feeds to form a gas mixture, and feed the gas mixture to at least one gas inlet of said reactor vessel.

The high temperature reactor section may comprise a gas inlet line connecting said mixing section and said at least one gas inlet, being arranged to feed the gas mixture from said mixing section to said at least one gas inlet, via one or more, preferably two or more 90° angles. In this arrangement, the first gas feed is suitably a synthesis gas feed and said second gas feed is suitably a $CO_2$-rich feed.

A second aspect of the invention relates to a reactor vessel (100) for high temperature catalytic reactions, said reactor (100) comprising a body portion (110), an inlet end portion (120) and an outlet end portion (130), wherein said body portion (110) extends between said inlet end portion (120) and said outlet end portion (130) along a central axis X-X of said reactor vessel (100), and wherein said body portion (110), said inlet end portion (120) and said outlet end portion (130) together define a reactor cavity (101);
  said body portion (110), having a substantially cylindrical form about a central axis X-X of said reactor vessel (100);
  a catalyst bed (200) of catalyst particles (201) being located within said reactor cavity (101) in said body portion (110);
  said inlet end portion (120) comprising one or more gas inlets (121);
  said outlet end portion (130) comprising one or more gas outlets (131);
characterised in that;
  said inlet end portion (120) comprises at least one sidewall (125); said sidewall(s) (125) comprising a diverging section (A) where the sidewall(s) (125) join the body portion (110),
  wherein said gas inlets (121) are arranged in a sidewall (125) of the inlet end portion (120); each gas inlet (121) defining a primary gas inlet flow direction vector (V) along which gas enters said reactor cavity (101), wherein said gas inlets are arranged such that the primary gas inlet flow direction vector (V) does not intersect said central axis (X-X), and
  wherein all gas-contacted inner surfaces of the reactor vessel are resistant to heat-induced deformation and degradation by contact with a gas having a temperature of at least 750° C.

A third aspect of the invention relates to a reactor vessel (100) for high temperature catalytic reactions, said reactor (100) comprising a body portion (110), an inlet end portion (120) and an outlet end portion (130), wherein said body portion (110) extends between said inlet end portion (120) and said outlet end portion (130) along a central axis X-X of said reactor vessel (100), and wherein said body portion (110), said inlet end portion (120) and said outlet end portion (130) together define a reactor cavity (101);
  said body portion (110), having a substantially cylindrical form about a central axis X-X of said reactor vessel (100);
  a catalyst bed (200) of catalyst particles (201) being located within said reactor cavity (101) in said body portion (110);
  said inlet end portion (120) comprising one or more gas inlets (121);
  said outlet end portion (130) comprising one or more gas outlets (131);
characterised in that;

said inlet end portion (120) comprises at least one sidewall (125); said sidewall(s) (125) comprising a diverging section (A), where the sidewall(s) (125) join the body portion (110), wherein said gas inlets (121) are arranged in a sidewall (125) of the inlet end portion (120); each gas inlet (121) defining a primary gas inlet flow direction vector (V) along which gas enters said reactor cavity (101), wherein said gas inlets are arranged such that the primary gas inlet flow direction vector (V) does not intersect said central axis (X-X), and wherein all gas-contacted inner surfaces of the reactor vessel are lined or coated with a layer of ceramic material.

A plant is provided for producing synthesis gas with a predetermined $H_2/CO$ ratio from a hydrocarbon feed. The plant comprises:

an steam reforming reactor comprising a first catalyst and being arranged to at least partially react said hydrocarbon feed with steam and thereby produce a first synthesis gas stream a reactor vessel as defined herein, in which the catalyst particles comprise a catalyst active for the steam reforming/methanation and reverse water gas shift reactions;

a first feed line arranged to lead at least a part of said first synthesis gas stream from the steam reforming reactor to at least one gas inlet of said reactor vessel;

a second feed line arranged to supply a second, $CO_2$-rich, gas feed to said reactor vessel; either directly via a separate gas inlet, or via a mixing section; wherein said mixing section is arranged to receive at least said first synthesis gas stream and said second gas feed from said first and second feed lines, mix said first and second gas feeds to form a gas mixture, and feed the gas mixture to at least one gas inlet of said reactor vessel;

said reactor vessel being arranged to react the first synthesis gas stream with said second gas feed of $CO_2$ and thereby provide synthesis gas with a predetermined $H_2/CO$ ratio via an outlet of said reactor vessel.

The plant may further comprise one or more heating means arranged to heat said second gas feed prior to said second gas feed being mixed with said first gas feed, or prior to said second gas feed being supplied to said reactor vessel, wherein said heating means being a fired heater, an electric heater or a heat exchange unit. Suitably, said heating means is a heat exchange unit, arranged to heat said second gas feed via heat exchange with synthesis gas with a predetermined $H_2/CO$ ratio from the outlet of said reactor vessel. This optimises the use of hot product gases.

Suitably, the steam reforming reactor is selected from an autothermal reactor (ATR), a steam methane reforming reactor (SMR), or a catalytic oxidation (CATOX) type reforming reactor, and is preferably an ATR.

A method is provided for producing synthesis gas with a predetermined $H_2/CO$ ratio from a hydrocarbon feed. The method comprises the steps of:

providing a plant as described herein, at least partially reacting the hydrocarbon feed with steam in the steam reforming reactor and thereby producing a first synthesis gas stream;

leading at least a part of said first synthesis gas stream from the steam reforming reactor to at least one gas inlet of said reactor vessel, by means of the first feed line, supplying a second, $CO_2$-rich, gas feed by means of second feed line to said reactor vessel; either directly via a separate gas inlet, or via a mixing section; wherein said mixing section is arranged to receive at least said first synthesis gas stream and said second gas feed from said first and second feed lines, mix said first and second gas feeds to form a gas mixture, and feed the gas mixture to at least one gas inlet (121) of said reactor vessel;

reacting the first synthesis gas stream with said second gas feed of $CO_2$ in said reactor vessel and thereby providing a synthesis gas with a predetermined $H_2/CO$ ratio via an outlet of said reactor vessel.

The present invention has been described with reference to a number of aspects, embodiments and figures. The person skilled in the art can combine elements and features from various aspects, embodiments and figures and thereby modify the invention within the scope of the appended claims.

DETAILED DISCUSSION OF THE FIGURES

FIG. 1 shows a schematic view of a reaction vessel according to the invention, seen in cross-section along central axis X-X.

FIGS. 2a-2d illustrate various embodiments of the reaction vessel, with various designs of inlet end portions.

Figure 3:
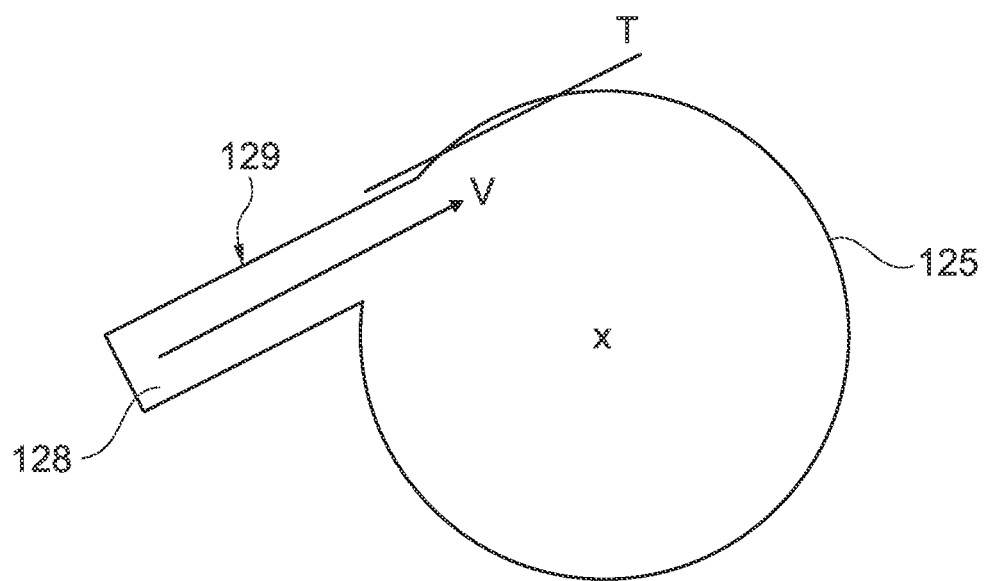
FIGS. 3 and 4 are cross-sectional views of two possible inlet end portions along central axis X-X.
Figure 4:
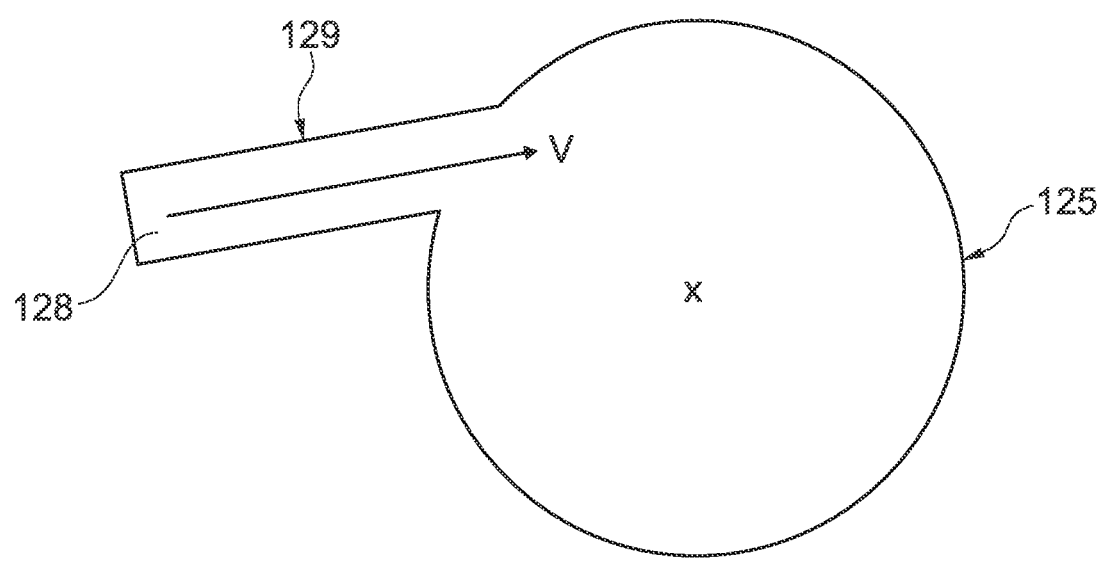
Figure 5:
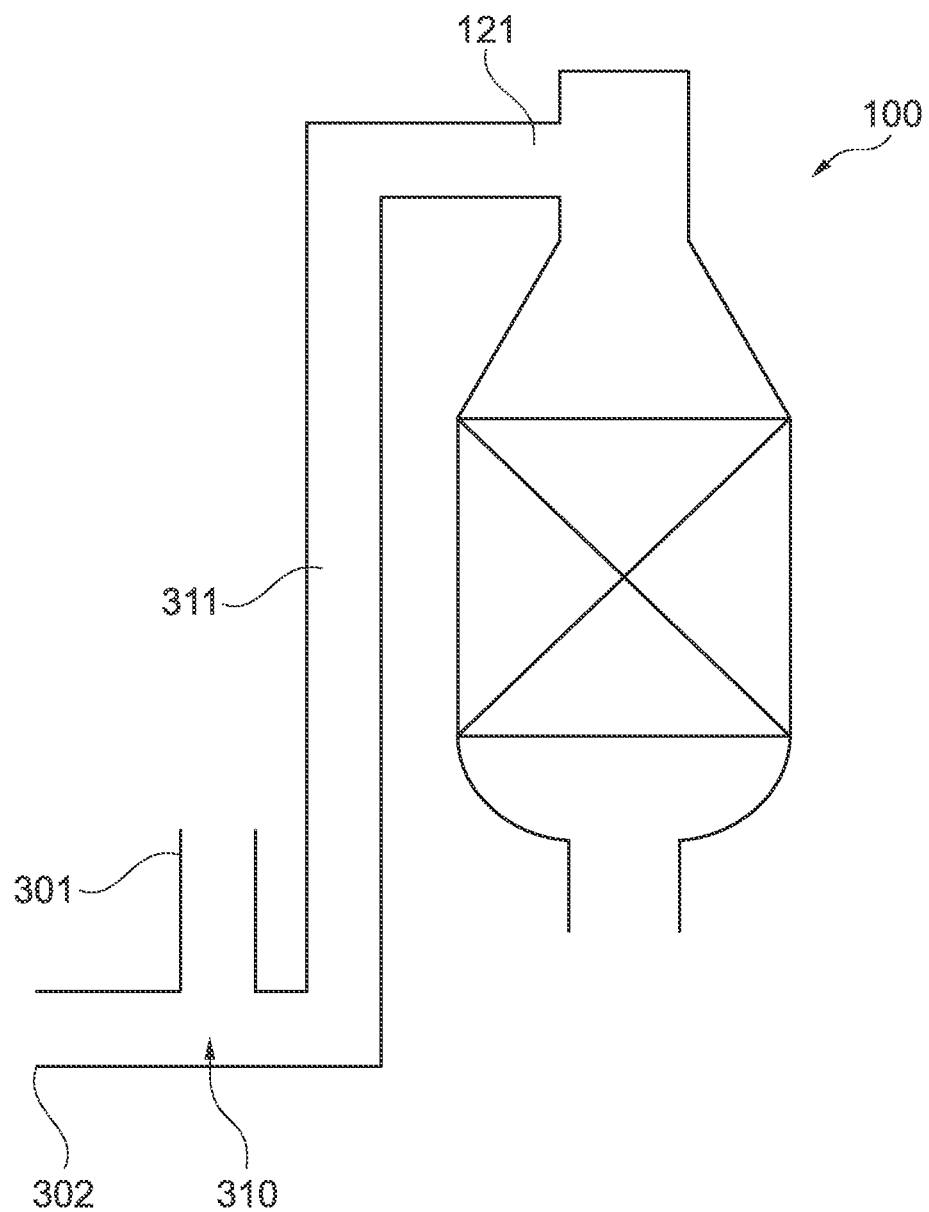
FIG. 5 shows a high temperature reactor section.

FIGS. 3 and 4 are cross-sectional views of two possible inlet end portions along central axis X-X FIG. 5 shows a high temperature reactor section, as defined herein, comprising;

the reactor vessel 100;

a first feed line 301 arranged to supply a first gas feed;

a second feed line 302 arranged to supply a second gas feed;

a mixing section 310;

The mixing section is arranged to receive at least first and second gas feeds from the first and second feed lines 301, 302, mix said first and second gas feeds to form a gas mixture, and feed the gas mixture to at least one gas inlet 121 of said reactor vessel 100.

The high temperature reactor section 300 comprises a gas inlet line 311 connecting said mixing section 310 and said at least one gas inlet 121, being arranged to feed the gas mixture from said mixing section 310 to said at least one gas inlet 121, via one or more, preferably two or more 90° angles. Typically, as mentioned above, the first gas feed is a synthesis gas feed and said second gas feed is a $CO_2$-rich feed.

Figure 6:
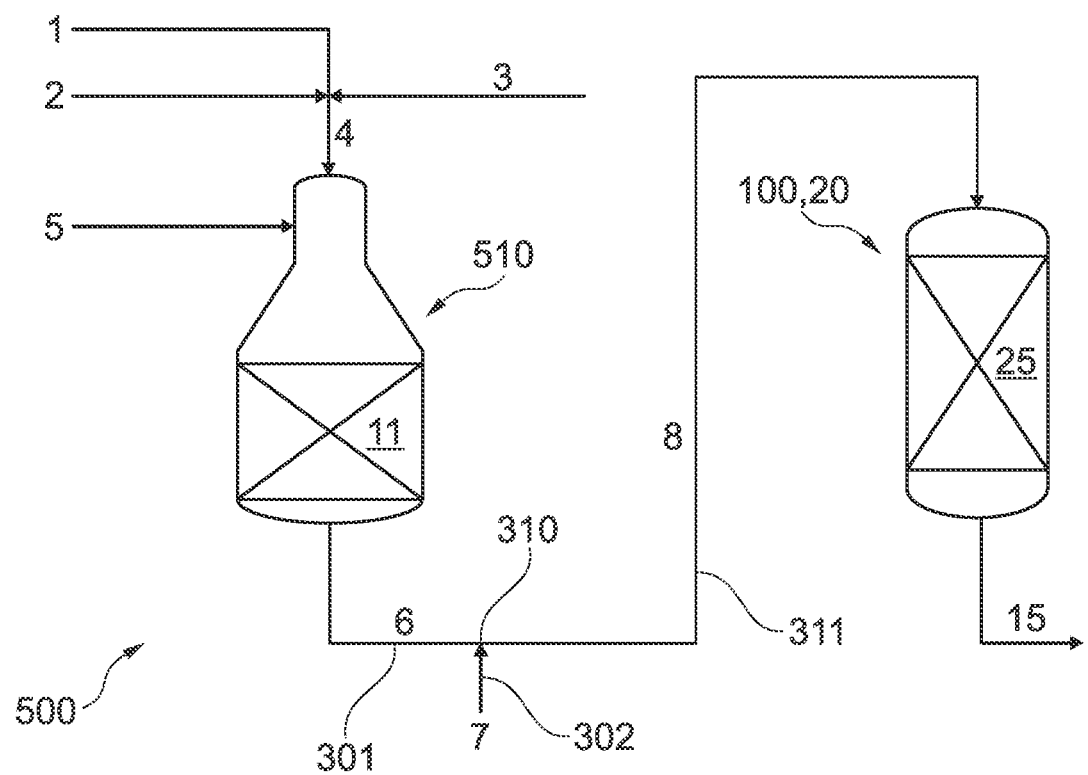
FIGS. 6 and 7 show schematic views of a plant for producing synthesis gas.
Figure 7:
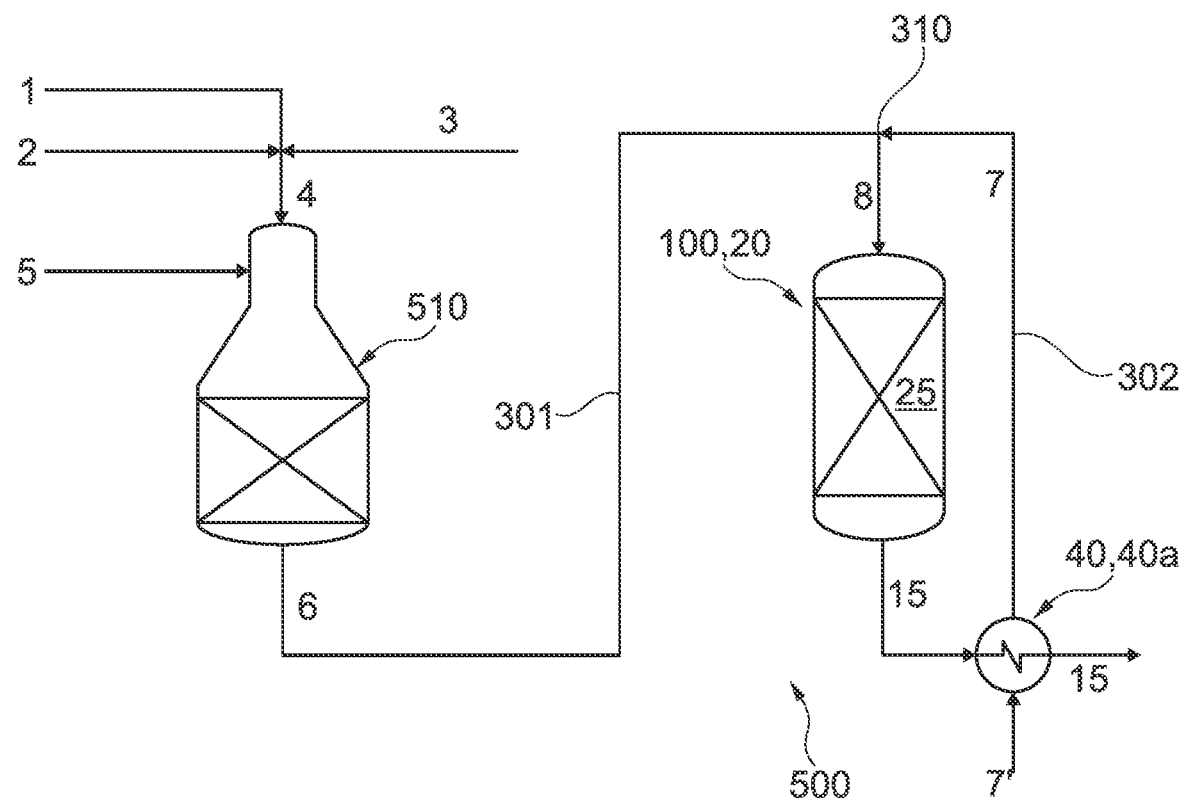

FIGS. 6 and 7 show schematic views of a plant for producing synthesis gas.

FIG. 6 is a schematic drawing of a plant 500 for producing synthesis gas according to the invention. The plant 500 comprises an ATR reactor 10 and reactor vessel in the form of an adiabatic post convertor 20.

A hydrocarbon feed stream 4 to the ATR reactor 10 of the plant 500 is made up of a hydrocarbon feed 1, a $CO_2$ rich gas stream 2, for example substantially pure $CO_2$, and steam 3. The $CO_2$ rich gas stream 2 and the steam 3 are added to the first hydrocarbon gas stream 1, hereby forming a combined stream 4 prior to inletting this combined stream 4 into the ATR reactor 10. The ATR reactor 10 houses a steam methane reforming catalyst 11. An oxygen-containing stream 5, such as air, an oxygen rich stream or substantially pure oxygen, is inlet into the combustion zone of the ATR reactor 10 via an inlet. The ATR reactor 10 produces a first synthesis gas stream 6 comprising hydrogen, carbon monoxide and carbon dioxide from the combined stream 4 and the oxygen containing stream 5. The first synthesis gas stream 6 exiting the ATR reactor typically has a temperature of between about 900° C. and about 1100° C., such as about 1000° C.

The adiabatic post convertor 20 houses particles 25 of a second catalyst active in catalysing the steam methane reforming/methanation and reverse water gas shift reactions.

A first feed line 301 connects the outlet from the ATR reactor 10 to at least one gas inlet of the adiabatic post convertor 20. A second feed line 302 is arranged to provide a heated $CO_2$ rich gas feed 7, which is added to the first synthesis gas stream 6 upstream of the adiabatic post convertor 20, thereby producing a mixed gas stream 8. This mixed gas 8 is inlet into the adiabatic post convertor, and the resulting synthesis gas 15 exits the reactor 20 as a product synthesis gas. The product synthesis gas 15 may undergo further processing downstream of the reactor 20.

The adiabatic post convertor 20 serves to equilibrate the mixed gas and thereby to decrease the $H_2/CO$ ratio of the resulting product synthesis gas 15 compared to the $H_2/CO$ ratio of the first synthesis gas 6.

In the embodiment shown in FIG. 6, the heated $CO_2$ rich gas stream 7 is added to the first synthesis gas 6 stream to a mixed gas stream 8 prior to being provided to the adiabatic post convertor 20. However, alternatively, the heated $CO_2$ rich gas stream 7 and the first synthesis gas 8 may be provided separately into the adiabatic post convertor 20 for mixing therein upstream the bed of catalyst 25.

FIG. 7 is a schematic drawing of a plant 500 for producing synthesis gas according to the invention. The plant 500 comprises the units/components of the plant 500 shown in FIG. 6. Similar units are denoted by similar reference numbers and will not be described in detail here. The plant 500 comprises heating means 40 in the form of heat exchanger 40a downstream the adiabatic post convertor 20. A $CO_2$ rich gas stream 7' is heated by heat exchange with the hot product synthesis gas 15 exiting the adiabatic post convertor, thereby rendering the heated $CO_2$ rich gas stream 7.

Example 1

A chemical reactor according to the invention having feed gasses according to Table 1 is modelled using computational fluid dynamics.

TABLE 1

| Stream | Syngas | CO2 |
| --- | --- | --- |
| Temperature [° C.] | 915 | 625 |
| Flow [Nm³/h] | 122957 | 21640 |
| Pressure [barg] | 27.5 | 28 |
| Composition [mole %] | | |
| CH4 | 5.7 | 0 |
| CO | 21.2 | 0 |
| CO2 | 4.4 | 100 |
| H2 | 52.8 | 0 |
| N2 | 0.2 | 0 |
| H2O | 15.7 | 0 |

In the modelled case, the two gases are mixed in a pipe with an internal diameter of 600 mm. There is 0.5 m from the mixing point to a first 90° bend upwards, 4.6 m pipe going vertically up before bending 90° into the horizontal plane going for 2.3 m before going into a cylindrical part perpendicular with an internal diameter of 1 m. 0.5 m below the pipe inlet, a 2 m conical section is placed where the internal diameter goes from 1 m to 2.4 m.

The mixing of $CO_2$ into the synthesis at relevant points in the reactor is shown in Table 2 for 2 cases with different configurations of the tube connections.

TABLE 2

| Case | 1 | 2 |
| --- | --- | --- |
| Synthesis gas velocity prior to mixing [m/s] | 18.6 | 18.6 |
| CO2 velocity prior to mixing [m/s] | 2.48 | 18.6 |
| CO2 molar concentration span at relative stages [mole %] | | |
| Before entrance to reactor | 10.4-18.3 | 13.2-17 |
| Top of conical section | 13.5-15.8 | 15.7-16.7 |
| 300 mm above catalyst bed | 13.5-15.8 | 14.8-15.6 |
| Above catalyst bed | 14.3-15.5 | 14.6-15.3 |
| Maixmum velocity in plane above catalyst [m/s] | 9 | 7.9 |

It is seen Case 1, that the configuration of the swirl inlet and the conical section helps decrease the relative standard deviation of the CO2 concentration from 15.1.% before entering the reactor to 2.1% just above the catalyst bed. In Case 2 where the velocity of the CO2 at the mixing point is increased, the relative standard deviation at the inlet to the reactor can be decreased to 5.9%, and then further decreased to 0.8% by the swirl inlet arrangement.

Overall, it is shown that to achieve a good mixing of the $CO_2$ into the synthesis gas, the configuration of the invention gives a significant impact.

The example also shows the maximum velocity in the plane just above the catalyst. Notice that the numbers are not exact, and the result of case 1 is not significantly different from case 2. When using an alumina ball of 20 mm in diameter with a density of 1800 kg/m³ as the top layer of the catalyst, the terminal velocity can be calculated according to:

$$v_t^2 = \frac{4 \cdot g \cdot d}{3 \cdot C_d} \cdot \frac{\rho_s - \rho}{\rho}$$

Here g is the gravitational acceleration, d is the diameter of the particles, Cd is the drag coefficient (assumed to be 0.6), $\rho_s$ is the density of the particles, and $\rho$ the density of the gas (5.73 kg/m³ in this case). For the given alumina particles the terminal velocity will then be 11.7 m/s, which is higher than the maximum velocity, where grinding/fluidization of the particles will not occur and the gas has there been sufficiently decelerated by the configuration of the invention.

Example 2

An example calculation of the method is given in Table 3 below. A hydrocarbon feed stream 4 comprising a hydrocarbon gas 1, a $CO_2$ rich stream 2 and steam 3 and having a S/C ratio of 0.6 is fed to the ATR reactor 10 as shown in FIG. 6. The hydrocarbon feed stream 4 is heated to 650° C. prior to being let into the ATR reactor 10. The ATR reactor 10 produces a first synthesis gas stream 6. An oxidant gas stream of oxygen 5 is added to the ATR reactor 10 and the amount thereof is adjusted such that the temperature of the first synthesis gas stream 6 is 1050° C.

The total flow of all components in all inlet streams to the ATR reactor and the flow of all components in the first synthesis gas stream 5 are given in the column headed "ATR 10" in Table 3.

A $CO_2$ rich gas stream is heated to a heated $CO_2$ rich gas stream having a temperature of 650° C. and the combined gas (the first synthesis gas stream and the heated $CO_2$ gas rich stream) enters the adiabatic post converter 20 at a temperature of 969° C.

Within the adiabatic post converter 20, the combined stream is equilibrated, viz. it undergoes reverse water gas shift, methanation and reforming reactions. The overall amount of carbon monoxide, steam and methane output from the adiabatic post converter 20 is increased compared to the gas inlet to it. The exit temperature of the product gas stream exiting the adiabatic post converter 20 is 951° C., which is well below the methane decomposition equilibrium temperature for the gas of 1195° C. and above the Boudouard temperature for the gas of 850° C. Consequently, the product gas stream does not have potential for carbon formation.

In this context, the methane decomposition temperature (T(MDC)) is calculated as the temperature where the equilibrium constant of the methane decomposition into graphite ($CH_4 \leftrightarrow C + 2H_2$) equals the reaction quotient of the gas. Formation of graphitic carbon can take place when the temperature is higher than this temperature. The reaction quotient QC is defined as the ratio of the square of the partial pressure of hydrogen to the partial pressure of methane, i.e. $QC = P^2_{H2}/P_{CH4}$.

The Boudouard equilibrium temperature (T(BOU)) is calculated in a similar way, but from the Boudouard reaction ($2CO \leftrightarrow C + CO_2$) and in this case formation of graphitic carbon can take place when the temperature is lower than this Boudouard equilibrium temperature.

TABLE 3

|  | ATR 10 | Adiabatic post converter 20 |
|---|---|---|
| Inlet T [° C.] | 650 | 969 |
| Outlet T [° C.] | 1050 | 951 |
| Inlet P [kg/cm²g] | 35.5 | 34.5 |
| Outlet P [kg/cm²g] | 34.5 | 34 |
| Outlet T(MDC) [° C.] | — | 1195 |
| Outlet T(BOU) [° C.] | 892 | 850 |
| Inlet: |  |  |
| $N_2$ [Nm³/h] | 27 | 251 |
| $CO_2$ [Nm³/h] | 8515 | 19356 |
| $CH_4$ [Nm³/h] | 19222 | 391 |
| $H_2$ [Nm³/h] | 405 | 32380 |
| $H_2O$ [Nm³/h] | 11639 | 17327 |
| CO [Nm³/h] | 0 | 21315 |
| Oxygen feed: |  |  |
| $O_2$ [Nm³/h] | 11018 |  |
| $N_2$ [Nm³/h] | 224 |  |
| Oxygen feed T [° C.] | 371 |  |
| Outlet: |  |  |
| $N_2$ [Nm³/h] | 251 | 251 |
| $CO_2$ [Nm³/h] | 6032 | 14597 |
| $CH_4$ [Nm³/h] | 391 | 779 |
| $H_2$ [Nm³/h] | 32380 | 26455 |
| $H_2O$ [Nm³/h] | 17327 | 22475 |
| CO [Nm³/h] | 21315 | 25685 |
| Total outlet flow [Nm³/h] | 77696 | 90242 |

Thus, when the method of the invention is used, it is possible to provide a product gas stream in the form of a synthesis gas having a relative high amount of CO.

Example 3

This Example relates to the same study as Example 1 and provides further information. CFD (Computational Fluid Dynamics) analysis was carried out to analyze the gas flow patterns, including mixing and velocity of the gas stream at point of impact with the catalyst bed, in three cases with different process parameters using two different reactor geometries of an Adiabatic Post Converter (APOC).

Reactor Geometries

| Parameter | Reactor 1 (m) | Reactor 2 (m) |
|---|---|---|
| Inlet diameter process gas | 0.6 | 0.6 |
| Inlet diameter $CO_2$ gas to process gas tube | 0.6 | 0.218 |
| Height of the catalyst bed | 2.6 | 2.6 |
| Cross section of reactor zone | 2.4 | 2.4 |
| Outlet diameter | 0.5 | 0.5 |
| Height of the frustoconical section | 2.0 | 2.0 |

Both reactors have the form of a larger diameter cylinder (the body portion) joined to a smaller diameter cylinder via the sidewall of a diverging, frustoconical section, wherein the gas inlets are introduced into the smaller diameter cylinder, and wherein the smaller diameter cylinder together with the divergent, frustoconical section make up the gas inlet portion.

Process Parameters

| Gas composition | Mass fractions (%) | Mole fractions |
|---|---|---|
| $CH_4$ | 7.17 | 5.7 |
| CO | 46.61 | 21.2 |
| $CO_2$ | 15.2 | 4.4 |
| $N_2$ | 0.43 | 0.2 |
| $H_2O$ | 22.2 | 15.7 |
| $H_2$ | 8.35 | 52.8 |

| Process parameters | Case 1 | Case 2 | Case 3 |
|---|---|---|---|
| Reactor configuration | Reactor 1 | Reactor 2 | Reactor 2 |
| Mass flow process gas (kg/s) | 19.41 | 19.41 | 19.41 |
| Mass flow $CO_2$ (kg/s) | 11.8 | 11.8 | 5.9 |
| Velocity at process gas inlet (m/s) | 18.6 | 18.6 | 18.6 |
| Velocity at $CO_2$ inlet (m/s) | 2.48 | 18.6 | 9.3 |
| Average Mole fraction of $CO_2$ in the reactor (%) | 15.0 | 15.0 | 8.0 |
| Temp. process gas (° C.) | 915 | 915 | 915 |
| Temp $CO_2$ (° C.) | 625 | 625 | 625 |

Results—Relative Standard Deviation of CO2 Mole Fraction at Different Levels in the Reactor

| Level | Case 1 (%) | Case 2 (%) | Case 3 (%) |
|---|---|---|---|
| Average value of CO2 mole fraction in reactor above catalyst bed | 15.0 | 15.0 | 8.0 |
| Entry into reactor in sidewall | 15.1 | 5.9 | 10.1 |
| Immediately above the catalyst bed | 2.1 | 0.8 | 0.56 |
| 300 mm above the catalyst bed | 2.5 | 0.9 | 0.91 |
| Top of the frustoconical section | 4.1 | 1.7 | 1.8 |

As will appear from the results, the Relative Standard Deviation of the $CO_2$ mole fraction significantly decreases along the flow path from the entry into the reactor sidewall through the top of the frustoconical section to immediately above the catalyst bed, in all cases being in the range of ±2% from the average value above the catalyst bed. Thus, the mixing of the $CO_2$ stream and the process gas steam is very efficient.

Results—Velocity of Gas at Point of Impact with Catalyst Bed

| Diameter of particle (mm) | Density of particle (kg/m$^2$) | Disruption threshold velocity m/s |
|---|---|---|
| 20 | 1800 | 11.67 |
| 25.4 (1 inch alumina balls) | 3600 | 18.62 |
| 50-8 (2 inch alumina balls) | 3600 | 26.34 |

For Cases 1, 2 and 3, the velocity of the mixed gas stream at the point of impact with the catalyst bed was calculated to 9.0, 7.9 and 7.1 m/s, respectively. Accordingly, in all cases the velocity of the mixed gas stream is well below the minimum velocity, where disruption of the catalyst bed will occur.

The invention claimed is:

1. A reactor vessel for high temperature catalytic reactions, said reactor comprising
    a body portion, an inlet end portion and an outlet end portion,
    wherein said body portion extends between said inlet end portion and said outlet end portion along a central axis X-X of said reactor vessel,
    wherein said body portion, said inlet end portion and said outlet end portion together define a reactor cavity,
    wherein said body portion has a cylindrical form about a central axis X-X of said reactor vessel,
    wherein the reactor vessel comprises a catalyst bed of catalyst particles, the catalyst bed being located within said reactor cavity in said body portion,
    wherein said inlet end portion comprises one or more gas inlets,
    wherein said outlet end portion comprises one or more gas outlets,
    wherein said inlet end portion comprises at least one sidewall, said at least one sidewall comprising a diverging section where the at least one sidewall joins the body portion,
    wherein said one or more gas inlets are arranged exclusively in the at least one sidewall of the inlet end portion, each of the one or more gas inlets defining a primary gas inlet flow direction vector along which gas enters said reactor cavity, wherein said one or more gas inlets are arranged such that the primary gas inlet flow direction vector does not intersect said central axis,
    wherein the interior space of the inlet end portion is constructed so that the cross-sectional area available for gas flow is constant or increasing along the central axis X-X in the direction from the one or more gas inlets to the body portion, and
    wherein the reactor vessel does not comprise a gas distributor.

2. The reactor vessel according to claim 1, wherein all gas-contacted inner surfaces of said reactor vessel are coated or lined with a layer of ceramic material.

3. The reactor vessel according to claim 1, wherein the inlet end portion and outlet end portion have circular cross-sections about the central axis X-X of the reactor vessel.

4. The reactor vessel according to claim 1, wherein said diverging section has a frustoconical form in which the at least one sidewall of the inlet end portion diverges from the body portion in the direction of the central axis X-X, said inlet end portion further comprising an endwall and wherein the at least one sidewall of the inlet end portion extends between the body portion and said endwall.

5. The reactor vessel according to claim 1, wherein said at least one sidewall of the inlet end portion comprises said diverging section, and a non-diverging section adjoining said diverging section, wherein—in said non-diverging section—the at least one sidewall of the inlet end portion extends in a direction parallel to said central axis X-X.

6. The reactor vessel according to claim 5, wherein the one or more gas inlets are arranged in one of the at least one sidewall of the non-diverging section of the inlet end portion.

7. The reactor vessel according to claim 1, wherein said at least one sidewall of the inlet end portion consists of said diverging section, such that the inlet end portion has a conical form which narrows from the body portion along the central axis X-X.

8. The reactor vessel according to claim 1, wherein the one or more gas inlets are arranged such that each gas flow direction vector lies in a plane perpendicular to the central axis X-X.

9. The reactor vessel according to claim 1, wherein the one or more gas inlets comprise one or more inlet tubes having an inlet sidewall defining a circular hollow cylinder in which the primary gas inlet flow direction vector constitutes the central axis of said hollow cylinder and in which the inlet sidewall is arranged in extension of a tangent to the at least one sidewall of the inlet end portion.

10. The reactor vessel according to claim 1, wherein said one or more gas inlets comprise two or more gas inlets, arranged such that each of the two or more gas inlets provides a different gas flows to the reactor vessel.

11. The reactor vessel according to claim 10, wherein the reactor vessel is an adiabatic post convertor; one of the two or more gas inlets being arranged to provide synthesis gas to the reactor vessel, and at least one other of the two or more gas inlets being arranged to provide a $CO_2$-rich gas feed to the reactor vessel.

12. The reactor vessel according to claim 1, wherein said one or more gas inlets comprise one gas inlet, arranged to provide a mixture of different gases to the reactor vessel via said one gas inlet.

13. The reactor vessel according to claim 1, being an adiabatic post convertor.

14. The reactor vessel according to claim 1, being a water gas shift reactor.

15. The reactor vessel according to claim 1, wherein said catalyst particles comprise a ceramic material which is coated and/or impregnated with a catalytic active metal or metal salt.

16. The reactor vessel according to claim 1, wherein said catalyst bed comprises two or more layers of different catalyst particles.

17. The reactor vessel according to claim 1, wherein said body portion further comprises a layer of catalytically-inert particles arranged at one surface of the catalyst bed.

18. The reactor vessel according to claim 1, wherein said reactor vessel is adapted for pressures between 15 and 45 barg.

19. A process for high temperature catalytic reactions comprising the steps of
    leading a gas having a temperature of at least 750° C. to at least one gas inlet of the reactor vessel of claim 1, and
    subjecting the gas to a catalytic reaction in said reactor vessel.

20. A plant for producing synthesis gas with a predetermined $H_2/CO$ ratio from a hydrocarbon feed, said plant comprising:

an steam reforming reactor comprising a first catalyst and being arranged to at least partially react said hydrocarbon feed with steam and thereby produce a first synthesis gas stream;

a reactor vessel according to claim 1, in which the catalyst particles comprise a catalyst active for the steam reforming/methanation and reverse water gas shift reactions;

a first feed line arranged to lead at least a part of said first synthesis gas stream from the steam reforming reactor to at least one gas inlet of said reactor vessel;

a second feed line arranged to supply a second, $CO_2$-rich, gas feed to said reactor vessel; either directly via a separate gas inlet, or via a mixing section; wherein said mixing section is arranged to receive at least said first synthesis gas stream and said second gas feed from said first and second feed lines, mix said first and second gas feeds to form a gas mixture, and feed the gas mixture to at least one gas inlet of said reactor vessel;

said reactor vessel being arranged to react the first synthesis gas stream with said second gas feed of $CO_2$ and thereby provide synthesis gas with a predetermined $H_2/CO$ ratio via an outlet of said reactor vessel.

21. The plant according to claim 20, further comprising one or more heating means arranged to heat said second gas feed prior to said second gas feed being mixed with said first gas feed, or prior to said second gas feed being supplied to said reactor vessel, wherein said heating means being a fired heater, an electric heater or a heat exchange unit.

22. The plant according to claim 21, wherein said heating means is a heat exchange unit, arranged to heat said second gas feed via heat exchange with the synthesis gas having a predetermined $H_2/CO$ ratio from the outlet of said reactor vessel.

23. The plant according to claim 20, wherein said steam reforming reactor is selected from an autothermal reactor (ATR), a steam methane reforming reactor (SMR), or a catalytic oxidation (CATOX) type reforming reactor.

24. A method for producing synthesis gas with a predetermined $H_2/CO$ ratio from a hydrocarbon feed, said method comprising the steps of:

providing a plant according to claim 20;

at least partially reacting the hydrocarbon feed with steam in the steam reforming reactor and thereby producing a first synthesis gas stream;

leading at least a part of said first synthesis gas stream from the steam reforming reactor to at least one gas inlet of said reactor vessel, by means of the first feed line, supplying a second, $CO_2$-rich, gas feed by means of second feed line to said reactor vessel; either directly via a separate gas inlet, or via a mixing section; wherein said mixing section is arranged to receive at least said first synthesis gas stream and said second gas feed from said first and second feed lines, mix said first and second gas feeds to form a gas mixture, and feed the gas mixture to at least one gas inlet of said reactor vessel;

reacting the first synthesis gas stream with said second gas feed of $CO_2$ in said reactor vessel and thereby providing a synthesis gas with a predetermined $H_2/CO$ ratio via an outlet of said reactor vessel.

* * * * *